United States Patent
Botero Halblaub et al.

(10) Patent No.: US 12,411,464 B2
(45) Date of Patent: Sep. 9, 2025

(54) CONTROLLING A TECHNICAL SYSTEM BY DATA-BASED CONTROL MODEL

(71) Applicant: Siemens Industry Software NV, Leuven (BE)

(72) Inventors: Andrés Botero Halblaub, Kirchseeon (DE); Tim Schenk, Landshut (DE); Till Heinzerling, Stutensee (DE); Harald Held, Bockhorn (DE)

(73) Assignee: Siemens Industry Software NV, Leuven (BE)

( * ) Notice: Subject to any disclaimer, the term of this patent is extended or adjusted under 35 U.S.C. 154(b) by 415 days.

(21) Appl. No.: 18/015,747

(22) PCT Filed: Jul. 29, 2020

(86) PCT No.: PCT/EP2020/071372
§ 371 (c)(1),
(2) Date: Jan. 12, 2023

(87) PCT Pub. No.: WO2022/022816
PCT Pub. Date: Feb. 3, 2022

(65) Prior Publication Data
US 2023/0221686 A1    Jul. 13, 2023

(51) Int. Cl.
*G05B 13/04* (2006.01)

(52) U.S. Cl.
CPC ................... *G05B 13/048* (2013.01)

(58) Field of Classification Search
CPC .. G06N 20/00; G05B 13/0265; G05B 13/048; G05B 13/042
(Continued)

(56) References Cited

U.S. PATENT DOCUMENTS

| | | | |
|---|---|---|---|
| 11,294,339 B2 * | 4/2022 | Tange | G06N 3/04 |
| 2017/0017212 A1 | 1/2017 | Collins et al. | |

(Continued)

FOREIGN PATENT DOCUMENTS

| | | |
|---|---|---|
| CN | 109886342 A | 6/2019 |
| CN | 110941272 A | 3/2020 |

(Continued)

OTHER PUBLICATIONS

Li Yang et al: "Adaptive load frequency control of wind power system based on online reinforcement learning"; Automation of Electric Power Systems; vol. 44; No. 12; Jun. 25, 2020.
(Continued)

*Primary Examiner* — Ronald D Hartman, Jr.
(74) *Attorney, Agent, or Firm* — Schmeiser, Olsen & Watts, LLP

(57) ABSTRACT

A method and a device for configuring a controller and to a method and a controller for controlling a technical system by means of a data-based control model is provided, in particular a model based on reinforcement learning. This data-based control model is configured using a model-predictive control model. Configuration parameters of the data-based control model are set by mapping the model-predictive control model onto the data-based control model in such a way that the data-based control model reproduces the output data of the model predictive control model depending on state data of the technical system read in, and determines optimized control parameters configured in this way. A computationally intensive training procedure for configuring the data-based control model can thus be avoided.

8 Claims, 2 Drawing Sheets

Figure 3:
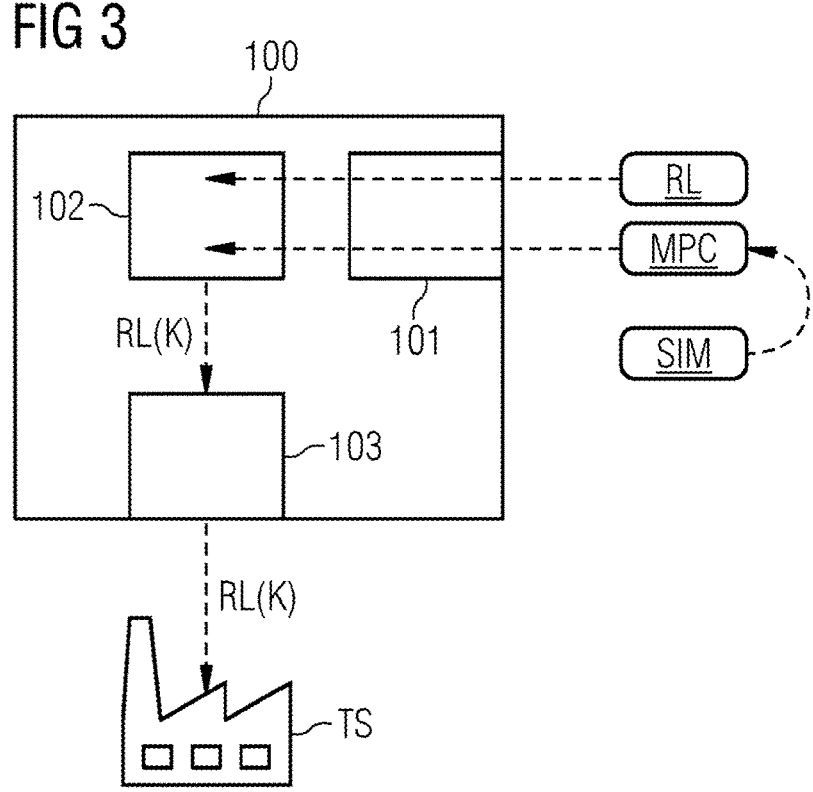

(58) Field of Classification Search
USPC .......................................................... 700/47
See application file for complete search history.

(56) References Cited

U.S. PATENT DOCUMENTS

| | | | |
|---|---|---|---|
| 2019/0031204 A1* | 1/2019 | Hartmann | G05B 13/048 |
| 2019/0041811 A1* | 2/2019 | Drees | G05B 15/02 |
| 2019/0094843 A1* | 3/2019 | Lee | G06N 5/04 |
| 2019/0095816 A1 | 3/2019 | Lee et al. | |
| 2019/0329772 A1 | 10/2019 | Graves | |
| 2020/0183338 A1* | 6/2020 | Tange | G06N 3/088 |

FOREIGN PATENT DOCUMENTS

| | | | | |
|---|---|---|---|---|
| CN | 111365828 A | | 7/2020 | |
| CN | 116203843 A | * | 6/2023 | |
| CN | 117452815 A | * | 1/2024 | |
| EP | 3428747 A1 | | 1/2019 | |
| WO | WO-2016010601 A2 | * | 1/2016 | ........... G05B 13/027 |
| WO | WO-2021168590 A1 | * | 9/2021 | ............. B25J 9/163 |
| WO | WO-2022197251 A1 | * | 9/2022 | ............. F24F 11/46 |
| WO | WO-2024163981 A1 | * | 8/2024 | |

OTHER PUBLICATIONS

PCT International Search Report mailed Apr. 9, 2021 for PCT/EP2020/071372.

\* cited by examiner

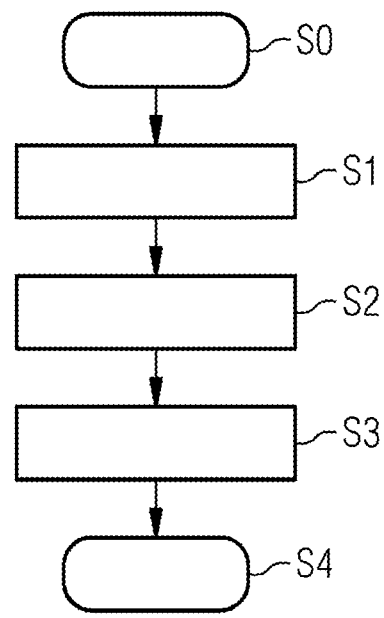
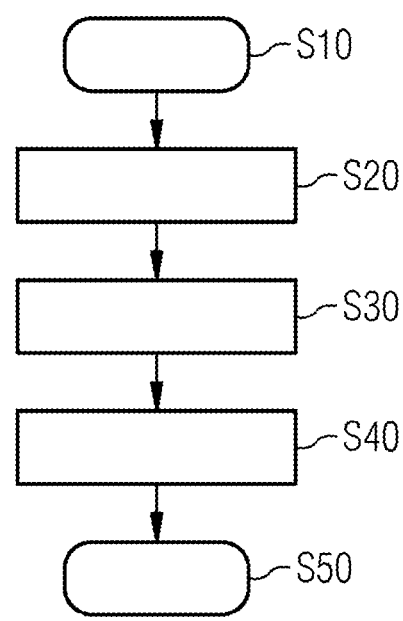

CONTROLLING A TECHNICAL SYSTEM BY DATA-BASED CONTROL MODEL

CROSS-REFERENCE TO RELATED APPLICATIONS

This application claims priority to PCT Application No. PCT/EP2020/071372, having a filing date of Jul. 29, 2020, the entire contents of which are hereby incorporated by reference.

FIELD OF TECHNOLOGY

The following relates to a computer-implemented method and a device for configuring a controller for controlling a technical system, a computer-implemented method and a controller for controlling a technical system by a data-based control model configured in this way, and to a computer program product.

BACKGROUND

An efficient operation of a technical system, such as a process-engineering plant in the chemical industry or a power plant, is typically carried out by operationally parallel control. Control is usually carried out on the basis of predetermined control parameters or manipulated variables starting from a detected system state, wherein the necessary optimum control parameters or manipulated variables can be determined by methods of model-predictive control. However, in particular for complex systems, such a control while the system is operational is difficult or even impossible due to higher computational effort.

US 2020/183338 A1 discloses a control device for controlling an object on the basis of reinforcement learning. US 2019/041811 A1 discloses a combined prediction model for a building management system consisting of an artificial neural network, a prediction based on a distance metric, and a regression model. US 2019/031204 A1 discloses a method for carrying out an optimized control of a complex dynamic system using machine-learning, scenario-based control heuristics.

SUMMARY

An aspect relates to simplifying an operational control of a technical system, in particular a complex technical system.

According to a first aspect, embodiments of the invention relate to a computer-implemented method for configuring a controller for controlling a technical system,
 a) reading in a model-predictive control model for the controller, wherein the model-predictive control model is configured to output optimized control parameters for controlling the technical system as output data, depending on simulated and/or measured state data of the technical system,
 b) reading in a data-based control model,
 c) adjusting configuration parameters of the data-based control model using the model-predictive control model in such a way that the data-based control model reproduces the output data of the model predictive control model depending on state data of the technical system read in, and determines optimized control parameters configured in this way, and
 d) outputting to the controller the data-based control model configured in this way for controlling the technical system.

The data-based control model configured in this way can be output in particular to a controller for controlling the technical system. Thus, in particular, the device according to embodiments of the invention can be coupled to such a controller.

According to a further aspect, embodiments of the invention relate to a device for configuring a controller for controlling a technical system, comprising
 an interface which is configured to read in a model-predictive control model for the controller, wherein the model-predictive control model is configured to output optimized control parameters for controlling the technical system as output data, depending on simulated and/or measured state data of the technical system, and to read in a data-based control model,
 a configurator which is configured to set configuration parameters of the data-based control model using the model-predictive control model, in such a way that the data-based control model reproduces the output data of the model-predictive control model depending on state data of the technical system read in, and determines optimized control parameters configured in this way,
 an output module configured to output to the controller the configured data-based control model for controlling the technical system.

The method according to embodiments of the invention can be implemented in particular in a computer-aided manner. Unless stated otherwise in the following description, the terms "carry out", "calculate", "computer-aided", "compute", "determine", "generate", "configure", "reconstruct" and the like relate to operations and/or processes and/or processing steps that change and/or generate data and/or convert data into other data, wherein the data may be represented or be present in particular in the form of physical variables, for example in the form of electrical pulses. The expression "computer" should in particular be interpreted as broadly as possible in order in particular to cover all electronic devices having data processing properties. Computers may thus for example be personal computers, servers, programmable logic controllers (PLC), hand-held computer systems, pocket PC devices, mobile radio devices and other communication devices that are able to process data in a computer-aided manner, processors and other electronic data processing devices. The device according to embodiments of the invention may be designed in hardware and/or software. If the device is designed in hardware, it can comprise in particular at least one processor. A processor in the context of embodiments of the invention may be understood to mean for example a machine or an electronic circuit. A processor may in particular be a main processor (central processing unit, CPU), a microprocessor or a microcontroller, for example an application-specific integrated circuit or a digital signal processor, possibly in combination with a memory unit for storing program commands, etc. A processor may also be understood to mean a virtualized processor, a virtual machine or a soft CPU.

"Provide", in particular with reference to data and/or information, in the context of embodiments of the invention may be understood to mean for example a computer-aided provision. By way of example, the provision is implemented by an interface, such as for example a network interface or an interface to a memory unit. Within the scope of the provision for example, corresponding data and/or information can be transmitted and/or sent and/or retrieved and/or received via an interface of this kind.

In particular, a "model-predictive control model" can be understood as a time-discrete dynamic model of a process of the technical system to be controlled. The model-predictive control model can be designed, in particular, on the basis of a method using model predictive control (MPC). With the model-predictive control model/With a model-predictive control system, a future process behavior can be computed depending on input signals or control parameters. In particular, this can be used to determine an optimized input signal or optimized control parameters in order to achieve an optimized output signal.

Thus, in the context of embodiments of the invention, "control parameters" can be understood in particular to mean input signals or manipulated variables for controlling/regulating the technical system. A state of the technical system is changed depending on the control parameters.

The model-predictive control model is configured depending on simulated and/or measured state data of the technical system. The model-predictive control model can be configured, in particular, on the basis of a provided computer-aided simulation model of the technical system, in order to output optimized control parameters for controlling the technical system as output data, depending on state data of the technical system generated by the computer-aided simulation model.

A technical system can be understood in particular as a plant, a process plant/process-engineering plant, a power plant, a device, a machine (e.g. a turbine), a robot, a vehicle, an autonomous vehicle or infrastructure networks (e.g. for water, gas, electricity or oil).

A "data-based control model" can be in particular a computer-aided model, which is configured in such a way as to output control parameters for controlling the technical system depending on data, here state data. In an embodiment, the data-based control model is based on a machine learning method or an artificial intelligence system. For example, the data-based control model is an artificial neural network.

It is an advantage of embodiments of the present invention that a data-based control model, in particular a model based on reinforcement learning, is easily configured to output optimized control parameters. The data-based control model is not trained or is trained with less computational effort using training data, because the configuration parameters, e.g. weights of an artificial neural network, are adjusted by the model-predictive control model in such a way that the output of the model-predictive control model is reproduced by the data-based control model. In addition, the method allows for a larger state space or behavior space to be covered, because the training of the data-based control model is not restricted only to a training data space. In other words, in a mapping of a model-predictive control model to the data-based control model a larger behavior space is taken into account, including e.g. extreme scenarios that typically occur rarely in measured data, but in which the control should also function correctly. This is achieved in particular by the fact that a validity range in the model-predictive control is covered if the physics-based equations are valid.

The present method therefore requires less computational effort than a standard training of a data-based model, such as a reinforcement learning model. Thus, information from the model-predictive control is used and extracted in order to configure the data-based control model. In particular, this method can be used to determine an initial configuration of the data-based control model.

In an advantageous embodiment of the computer-implemented method, the configuration parameters of the data-based control model can be set by mapping the model-predictive control model onto the data-based control model.

The model-predictive control model can be provided, for example, as a state-space model or in a state-space representation. All relationships of the input, output and state variables can be represented in the form of matrices and vectors. This allows a mapping, in particular a geometric mapping, of the model-predictive control model to the data-based control model to be realized. The configuration parameters of the data-based control model are thus set by the mapping. For example, the model representation of the data-based control model can be adapted from the information of the model-predictive control such as state and manipulated variable, so that the output of the data-based control model reproduces the output of the model-predictive control model. A mapping matrix or mapping function can be determined, for example, on the basis of the model-predictive control model and the output of the data-based control model to be achieved. In other words, the configuration parameters of the data-based control model are set such that, depending on the input values, the output values of the model-predictive control and the output values of the data-based control model approximate to each other.

In one embodiment of the computer-implemented method, the data-based control model can be configured on the basis of a machine learning method.

In one embodiment of the computer-implemented method, the data-based control model can be configured as an agent of a reinforcement learning method.

For example, the model-predictive control model can be mapped to the agent of the reinforcement learning method, with the configuration parameters being set accordingly to reproduce the output of the model-predictive control model.

In one embodiment of the computer-implemented method, the configuration parameters of the data-based control model are adapted on the basis of further state data and by the reinforcement learning method to determine further optimized control parameters.

In particular, the configured data-based control model can be regarded as preconfigured or trained, i.e. the configuration parameters are preset based on the model-predictive control model. Further training data, i.e. further state data of the technical system, can be used to improve the accuracy of the data-based control model.

In one embodiment of the computer-implemented method the model-predictive control model can be configured on the basis of a model-predictive control method.

According to a further aspect, embodiments of the invention relates to a computer-implemented method for controlling a technical system, comprising the method steps:
  reading in a data-based control model configured according to embodiments of the invention,
  reading in measured state data of the technical system,
  determining optimized control parameters for controlling the technical system by evaluating the configured data-based control model based on the measured state data,
  outputting the optimized control parameters to control the technical system
and
  controlling the technical system by the optimized control parameters.

The method can be carried out in particular by a controller which comprises a data-based control model configured according to embodiments of the invention for controlling the technical system. In particular, a controller can be understood as a device which in technical systems (particularly as part of a control loop), sets or controls the desired gear, or the correct level, strength etc. of something.

According to a further aspect, embodiments of the invention relate to a controller for controlling a technical system, comprising
- a first interface for reading in measured state data of the technical system,
- a control module, which is configured in such a way as to receive a data-based control model configured according to embodiments of the invention and to output optimized control parameters by evaluating the data-based control model on the basis of the measured state data of the technical system, and
- a second interface for outputting the optimized control parameters to control the technical system.

Embodiments of the invention furthermore relate to a computer program product (non-transitory computer readable storage medium having instructions, which when executed by a processor, perform actions) which can be loaded directly into a programmable computer, comprising program code parts which, when the program is executed by a computer, cause the computer to carry out the steps of a method according to embodiments of the invention.

A computer program product may be provided or supplied for example on a storage medium such as for example a memory card, USB stick, CD-ROM, DCD, a non-transitory storage medium or else may be provided or supplied in the form of a downloadable file from a server in a network.

BRIEF DESCRIPTION

Figure 4:
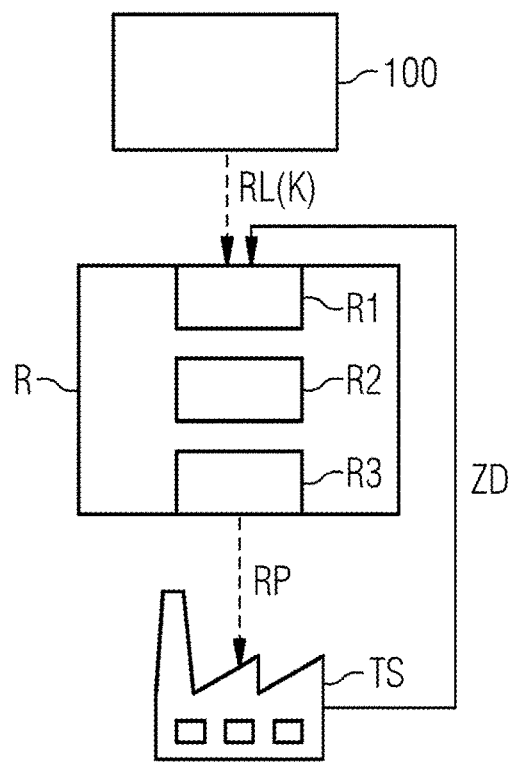

Some of the embodiments will be described in detail, with reference to the following figures, wherein like designations denote like members, wherein:

FIG. 1: shows an exemplary embodiment of the method for configuring a controller to control a technical system;

FIG. 2: shows an exemplary embodiment of the device for configuring a controller to control a technical system;

FIG. 3: shows an exemplary embodiment of the method for controlling a technical system; and FIG. 4: shows an exemplary embodiment of a controller for controlling a technical system.

DETAILED DESCRIPTION

In particular, the exemplary embodiments that follow merely show illustrative realization possibilities, how in particular such realizations of the teaching according to embodiments of the invention could be manifested, since it is impossible and also not helpful or necessary for the understanding of embodiments of the invention to name all these realization possibilities.

A (relevant) person skilled in the conventional art having knowledge of the one or more method claims is also in particular aware of all options for embodiments of the invention that are routine in the conventional art, and so there is in particular no need for any independent disclosure in the description.

FIG. 1 shows an exemplary embodiment of the computer-implemented method according to the invention for configuring a controller to control a technical system as a flowchart. In particular, the technical system can be a complex technical system, such as a factory system. The computer-implemented method comprises the following method steps:

First, a model-predictive control model is provided, step S0. The model-predictive control model allows optimized control parameters for controlling the technical system to be determined and output. The model-predictive control model is thus configured to output optimized control parameters as output data depending on (computer-based) simulated and/or measured state data of the technical system. The determination of the optimized control parameters is based on an optimization procedure.

For example, the model-predictive control model can be generated on the basis of a model-predictive control method or a Lyapunov function, wherein in particular a target behavior of the system to be controlled can be defined by definition of formal specifications, such as, for example control quality, temporal requirements, prohibited work areas, and behavioral function, and other constraints such as logistics.

The state data can be measured and provided, for example, by at least one sensor. In addition or alternatively, the state data can also be determined and provided by a computer-aided simulation of the technical system. In this case, the model-predictive control model can be generated on the basis of a computer-aided simulation model of the technical system.

In the next step S1, the model-predictive control model is read in. The model-predictive control model can be used in particular to determine optimized control parameters depending on provided state data of the technical system. This allows data pairs consisting of state data and associated optimized control parameters to be generated.

In the next step S2, a data-based control model is read in. In particular, the data-based control model can be a reinforcement learning model, realized e.g. as an artificial neural network. In particular, the data-based control model can be merely preconfigured, i.e. for example it is suitable for controlling the technical system, but not yet optimized for this purpose. In other words, a form or pre-configuration of the data-based control model can thus be specified.

In the next step S3, configuration parameters of the data-based control model are adapted to reproduce the output data of the model-predictive control model. For this purpose, the data pairs consisting of state data and associated optimized control parameters are used, which are provided by the model-predictive control. These data pairs represent an initial workable result. The data-based control model (the RL algorithm) is then configured such that it reproduces this result.

In particular, the model-predictive control model is mapped to the data-based control model in order to set the configuration parameters. The mapping can be performed analytically or numerically, for example.

In other words, the internal structure of the model-predictive control model is mapped to the internal structure of the data-based control model, for example by a geometric mapping, in such a way that the data-based control model reproduces the model behavior of the model-predictive control model. For this purpose, the configuration parameters of the data-based control model are set in such a way that it outputs the control parameters determined by the model-predictive control model as a function of input state data. For example, this can be treated as an inverse problem using Bayesian fitting.

This mapping can be formally described in other words as follows:

The technical system typically has at least one observable, time-dependent state $x(t)$, which depends on a control parameter $u(t)$. Model-predictive control can be used to solve the following optimization problem: a function J(u,x), which specifies the desired constraints on the technical system, is minimized with respect to the control parameter u in order to determine an optimized control parameter u'. The optimization can be solved either numerically or analytically or by using a black box solver. In an embodiment, this is carried out for a plurality of given initial states x0 in order to obtain optimized control parameters u'(x0) in each case. These data pairs (x0,u'(x0)) can be used to configure the data-based control model. A model underlying the data-based control model, such as an artificial neural network, can be designated by RL(w; x_0), where w represents the configuration parameters of the data-based control model. By mapping the model-predictive control model to the data-based control model, these parameters can be determined so that the output of the data-based control model matches the output of the model-predictive model within a tolerance range. The configuration parameters w defined in this way can be understood in particular as initial configuration parameters of the data-based control model, i.e. by further training by state data of the technical system the data-based control model can be further matched to the technical system.

In the next step S4, the data-based control model configured in this way is output to the controller. The technical system can be controlled by the controller using the data-based control model. This is in particular less computationally intensive and thus enables control during operation even in complex technical systems.

The configured, data-based control model can be further matched to the technical system by additional training data. For example, the data-based control model can be configured as an agent of a reinforcement learning method and can be adapted based on further state data, e.g. during the ongoing operation of the technical system, using the reinforcement learning method. This allows the data-based control model/the agent to be continuously improved.

FIG. 2 shows an exemplary embodiment of a computer-implemented method according to the invention for controlling a technical system by a configured, data-based control model.

In step S10, the data-based control model is read in. The data-based control model is configured according to a method as shown by way of example in FIG. 1, i.e. the data-based control model is configured in such a way that optimized control parameters for the technical system are output depending on the given state data of the technical system. For example, the data-based control model configured in this way is read in or loaded by a controller to control the technical system.

In the next step S20, measured state data of the technical system is read in. For example, the state data is acquired by at least one sensor. Based on this state data, the technical system is designed to be optimally controlled by the accordingly configured controller.

To this end, in the next step S30, optimized control parameters are determined using the data-based control model. The data-based control model is executed so that, depending on the state data read in, optimized control parameters are output, step S40. The controller can control the technical system using these optimized control parameters, step S50.

FIG. 3 shows an exemplary embodiment of a device 100 according to the invention for configuring a controller to control a technical system as a block diagram. The device 100 is coupled to the controller.

The device 100 comprises an interface 101, a configurator 102 and an output module 103.

The interface 101 is configured to read in a model-predictive control model MPC and a data-based control model RL. For example, the two control models MPC, RL can be stored externally and retrieved from there.

The model-predictive control model MPC is generated on the basis of a computer-aided simulation model SIM and configured in such a way as to determine optimized control parameters for controlling the technical system depending on state data generated by the simulation model SIM. In particular, the data-based regulation model RL can be a reinforcement learning model.

The configurator 102 is configured to set configuration parameters K of the data-based control model RL based on the model-predictive control model, so that the data-based control model RL reproduces the output of the model-predictive control model depending on the state data read in. The configuration parameters can be set, for example, by mapping the internal structure of the model-predictive control model MPC onto the internal structure of the data-based control model RL. By way of example, this mapping can be a geometric mapping.

The data-based control model RL(K) configured according to these configuration parameters K is transferred to the output module 103. The output module 103 is configured to output to the controller the configured data-based control model RL(K) to control the technical system TS.

FIG. 4 shows an exemplary embodiment of the controller R according to the invention for controlling a technical system TS, such as a machine or a factory system, in a block diagram.

The controller R is coupled with a device 100 according to embodiments of the invention for configuring the controller, as described by way of example in FIG. 3, or alternatively comprises such a device 100 (not shown). The device 100 provides a configured, data-based control model RL(K), which is configured in such a way as to output optimized control parameters for controlling the technical system TS.

The controller R comprises a first interface R1, a control module R2 and a second interface R3.

The configured, data-based control model RL(K) is received and read in by the device 100 via the first interface R1. In addition, measured state data ZD of the TS technical system is read in via the first interface R1.

The control module R2 is configured in such a way as to receive the data-based control model RL(K) or, alternatively, to store it in an internal memory (not shown) and retrieve it from there.

The control module R2 is further configured to execute the data-based control model RL(K). Depending on the state data ZD read in, at least one optimized control parameter RP for controlling the technical system TS is determined and output.

The at least one optimized control parameter RP is output from the second interface R3 to the technical system TS. The technical system TS can therefore be controlled by the controller R according to the control parameter RP.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring a controller to control a technical system, comprising:
   a) reading in a model-predictive control model for the controller, wherein the model-predictive control model is configured to output optimized control parameters for controlling the technical system as output data, depending on simulated or measured state data of the technical system, wherein the model-predictive control model is configured on the basis of a model-predictive control method;
   b) reading in a data-based control model;
   c) adjusting configuration parameters of the data-based control model using the model-predictive control model in such a way that the data-based control model reproduces the output data of the model-predictive control model depending on state data of the technical system to determine optimized control parameters, wherein the configuration parameters of the data-based control model are set by mapping an internal structure of the model-predictive control model onto an internal structure of the data-based control model; and
   d) outputting to the controller the data-based control model configured in this way to control the technical system.

2. The computer-implemented method as claimed in claim 1, wherein the data-based control model is configured on the basis of a machine learning method.

3. The computer-implemented method as claimed in claim 1, wherein the data-based control model is configured as an agent of a reinforcement learning method.

4. The computer-implemented method as claimed in claim 3, wherein the configuration parameters of the data-based control model are configured on the basis of further state data and by the reinforcement learning method to determine further optimized control parameters.

5. A device for configuring a controller to control a technical system, comprising:
   an interface which is configured to read in a model-predictive control model for the controller, wherein the model-predictive control model is configured to output optimized control parameters for controlling the technical system as output data, depending on simulated or measured state data of the technical system, and to read in a data-based control model, wherein the model-predictive control model is configured on the basis of a model-predictive control method;
   a configurator which is configured to set configuration parameters of the data-based control model on the basis of the model-predictive control model in such a way that the data-based control model reproduces the output data of the model-predictive control model depending on state data of the technical system to determine optimized control parameters, wherein the configuration parameters of the data-based control model are set by mapping an internal structure of the model-predictive control model onto an internal structure of the data-based control model; and
   an output module which is configured to output to the controller the configured data-based control model to control the technical system.

6. A computer-implemented method for controlling a technical system, comprising:
   reading in a data-based control model configured according to claim 1;
   reading in measured state data of the technical system;
   determining optimized control parameters for controlling the technical system by evaluating the configured data-based control model based on the measured state data;
   outputting the optimized control parameters to control the technical system;
   and
   controlling the technical system by the optimized control parameters.

7. A controller for controlling a technical system, comprising:
   a first interface for reading in measured state data of the technical system;
   a control module, which is configured so as to receive a data-based control model configured according to claim 1 and to output optimized control parameters by evaluating the data-based control model on the basis of the measured state data of the technical system; and
   a second interface to output the optimized control parameters to control the technical system.

8. A non-transitory computer readable storage medium having program code stored therein, the program code executable by a processor of a computer system to implement a method which can be loaded directly into a programmable computer, the program code carrying out the method as claimed in claim 1.

* * * * *